United States Patent
Capel et al.

(10) Patent No.: US 6,744,236 B2
(45) Date of Patent: Jun. 1, 2004

(54) ENERGY REGULATION SYSTEM FOR AN ELECTRICAL POWER SUPPLY BUS

(75) Inventors: Antoine Capel, Goyrans (FR); Pascal Lecointe, Plan de Cuques (FR)

(73) Assignee: Alcatel, Paris (FR)

( * ) Notice: Subject to any disclaimer, the term of this patent is extended or adjusted under 35 U.S.C. 154(b) by 248 days.

(21) Appl. No.: 10/200,749

(22) Filed: Jul. 24, 2002

(65) Prior Publication Data

US 2003/0038616 A1 Feb. 27, 2003

(30) Foreign Application Priority Data

Aug. 27, 2001 (FR) .......................................... 01 11132

(51) Int. Cl.$^7$ ................................................ H02J 7/10
(52) U.S. Cl. ........................ 320/101; 320/162; 323/906
(58) Field of Search ................................ 323/234, 906, 323/288; 320/101, 117, 118, 119, 120, 121, 137, 162, 163, 164

(56) References Cited

U.S. PATENT DOCUMENTS

| | | | |
|---|---|---|---|
| 4,571,532 A | * | 2/1986 | Jaster .......................... 320/101 |
| 5,530,335 A | | 6/1996 | Decker et al. |
| 6,157,161 A | | 12/2000 | Canter et al. |
| 6,181,115 B1 | | 1/2001 | Perol et al. |

FOREIGN PATENT DOCUMENTS

FR          2 785 103 A1     4/2000

* cited by examiner

*Primary Examiner*—Jessica Han
(74) *Attorney, Agent, or Firm*—Sughrue Mion, PLLC

(57) ABSTRACT

The present invention relates to an electrical energy regulator system for a power supply bus, the system including:
  an electrical energy storage unit,
  a solar generator having a plurality of cells,
  a system for regulating the bus power supply voltage adapted to impose on each cell one of the following three states:
    a first state in which the bus is supplied with current,
    a second state in which the storage unit (BAT) is supplied with current, and
    a third state in which the cell is shunted,
the cells being divided by the bus voltage regulator system into:
  a first group in which at least one cell supplies power to the bus and one cell is assigned to regulation of the voltage of the bus and is in its first state only when maintaining a nominal bus voltage requires a top-up of current, and
  a second group in which at least one cell is either in a second state or in a third state, as a function of a required charging current of the storage unit, the number of cells in the second state being a function of the required charging current.

The system further includes a system means for regulating the charging of the storage unit which assign at least one cell of the second group to supplying power to the storage unit (BAT) and one cell of the second group to regulating the voltage of the storage unit, the storage unit charging voltage regulator cell being in its second state only when maintaining a nominal charging voltage requires a top-up of current.

8 Claims, 2 Drawing Sheets

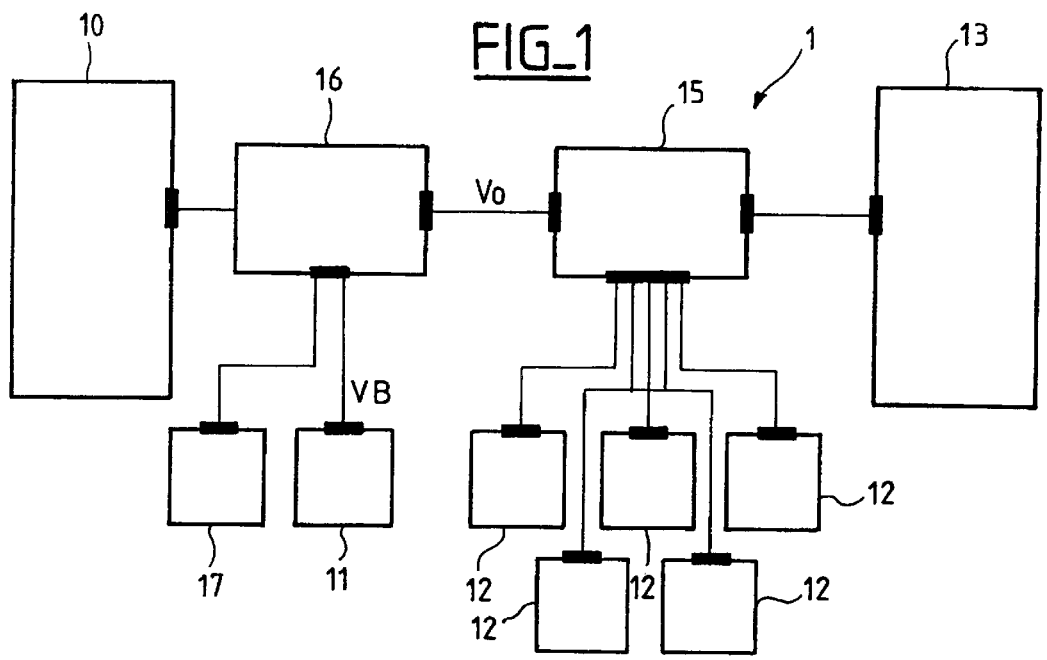
FIG_1
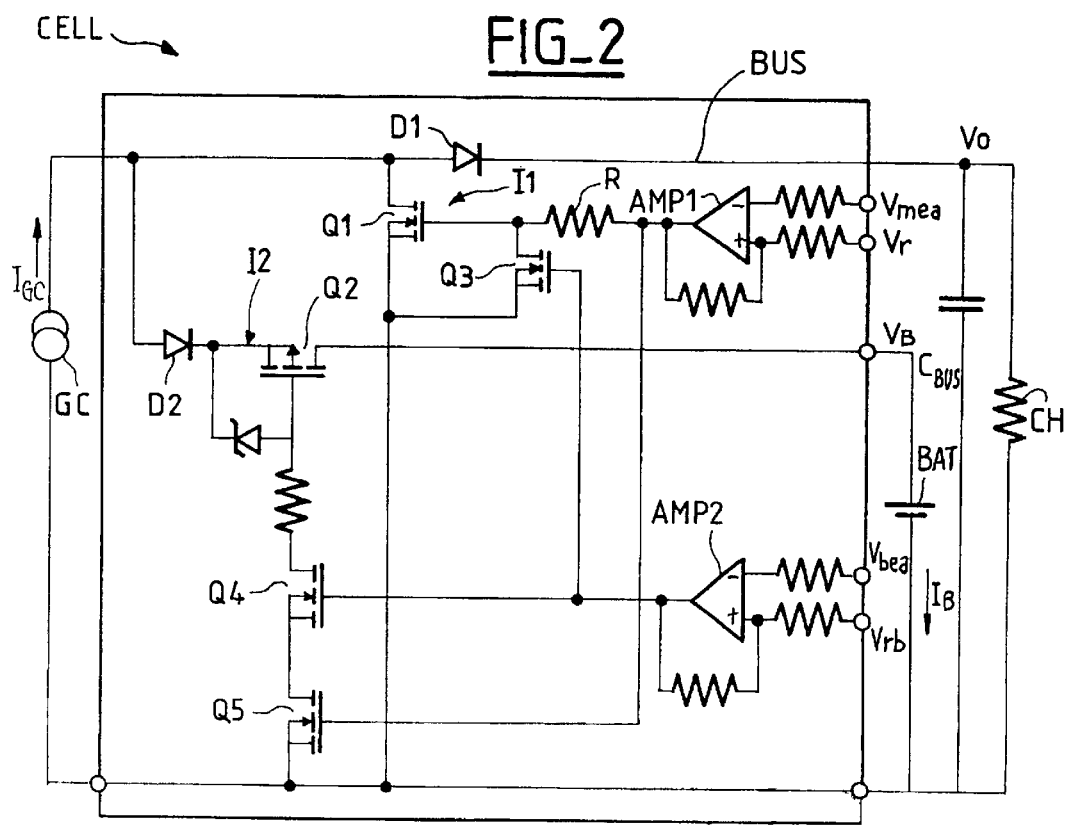
FIG_2

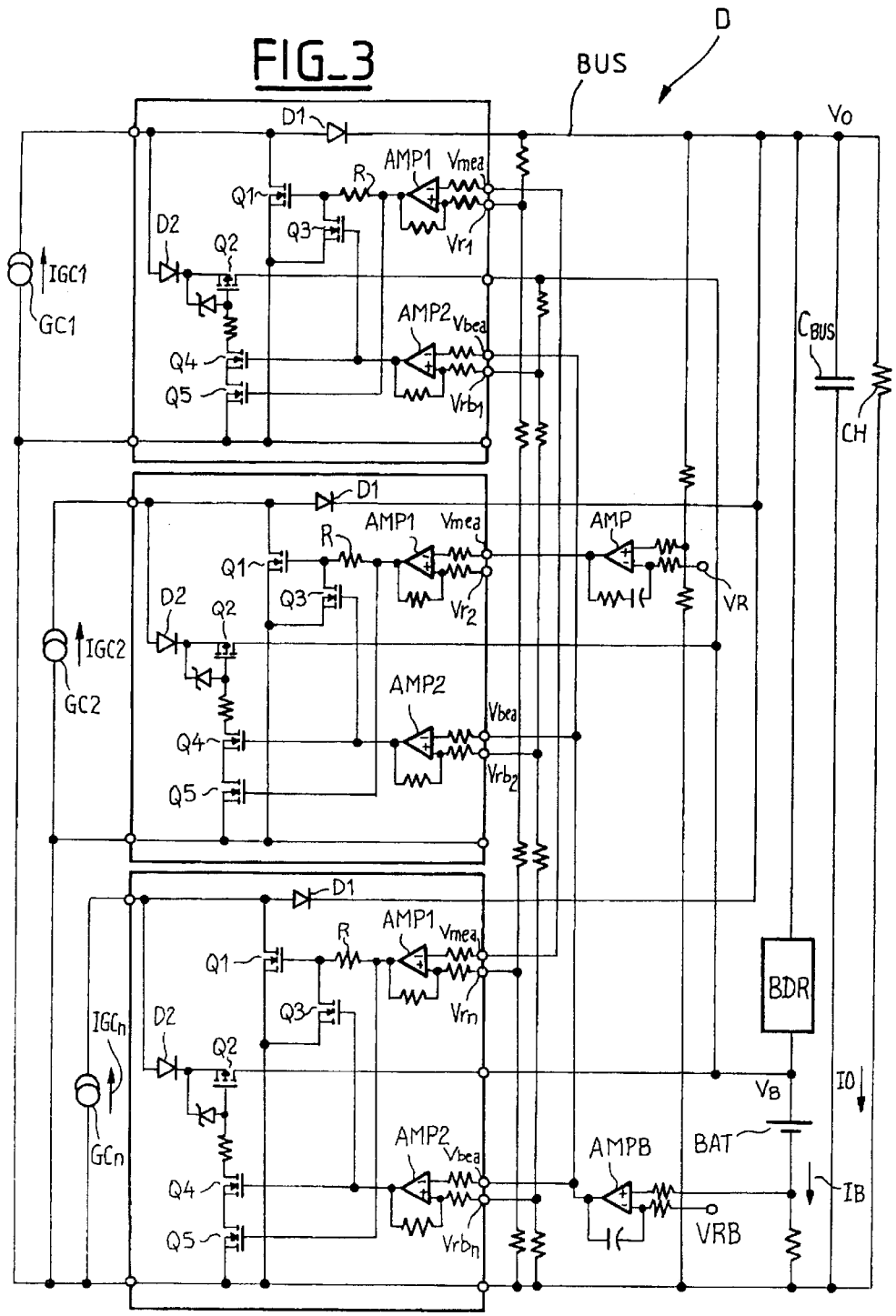

ENERGY REGULATION SYSTEM FOR AN ELECTRICAL POWER SUPPLY BUS

The present invention relates to an energy regulation system for an electrical power supply bus, in particular of the type used on board a satellite.

BACKGROUND OF THE INVENTION

The network to be supplied with power on board a satellite, comprising the payload and the service platform of the satellite itself, is supplied with power from the following two energy sources, via a power supply bus:

a solar generator (using solar energy recovered by solar panels of the satellite), which converts light energy into electrical energy, and generally comprises a plurality of cells, and an electrical energy storage unit comprising one or more batteries for storing a portion of the electrical energy from the solar generator and converting it into electrochemical energy that is available in the form of electrical energy during eclipses or consumption peaks.

As the person skilled in the art is well aware, the supply buses used on board satellites operate at a predetermined regulated voltage, generally 50 V or 100 V. This regulation optimizes the electrical and mass performance of the electrical equipment of the satellite and of the energy resources.

The document FR-2 785 103 describes one prior art energy regulation system for an electrical power supply bus.

Its basic principle is to regulate the power supply bus voltage distributed to the network by means of a shunt section between each cell of the solar generator and the network and a control system which distributes a control signal simultaneously to all the cells. Also, in accordance with the basic principle of the prior art system, the battery voltage is regulated by a series section delivering a charging current to the battery and connecting each cell of the solar energy generator to the latter.

In the prior art, the two sections of each cell (i.e. the section regulating the power supply bus voltage and the section regulating battery charging) cannot operate simultaneously and the system is controlled by logic which prevents simultaneous operation.

Bus voltage regulation as a function of the control voltage has priority. Thus the shunt sections are either open circuit (when energy is transferred to the network) or closed circuit (when energy is not used and is therefore lost).

The prior art system gives rise to a number of problems.

First of all, it cannot effect fine regulation of the charging of the battery in accordance with standard battery charging methods, in other words it cannot effect some of the charging at a constant current and further charging (the end of charging) at a constant voltage, i.e. with varying current.

It also relies on the onboard computer of the satellite to choose which cells control the battery charging regulation system and in particular simultaneous operation of the two sections of each cell. As the computer is itself supplied with power by the power supply bus, a system of this kind is not autonomous and cannot be truly reliable.

OBJECTS AND SUMMARY OF THE INVENTION

An object of the present invention is therefore to provide an energy regulation system for an electrical power supply bus that can operate autonomously on board a satellite, in particular without relying on the onboard computer of the satellite, and which optimizes energy use on board the satellite to enable battery charging and bus voltage to be regulated finely.

To this end, the present invention proposes an electrical energy regulator system for a power supply bus connected to a load network using said electrical energy, said system including:

an electrical energy storage unit, a solar generator comprising a plurality of cells, for each of said cells, means for regulating the power supply voltage of said bus adapted to impose on said cell one of the following three operating states:

a first state in which current from said cell supplies power to said bus, a second state in which current from said cell supplies power to said storage unit, and a third state in which said cell is shunted, said cells being divided by said bus voltage regulator means into:

a first group in which at least one of said cells supplies power to said bus and one of said cells referred to as a bus voltage regulator cell is assigned to regulation of the voltage of said bus and to this end is in its first state only when maintaining a nominal bus voltage requires a top-up of current from said cell, and a second group in which at least one of said cells is either in a second state or in a third state, as a function of a required charging current of said storage unit, the number of cells in the second state being a function of the required charging current, wherein each of said cells further includes means for regulating the charging of said storage unit which assign at least one of said cells of said second group to supplying power to said storage unit and one of said cells, referred to as a storage unit charging regulator cell, to regulation of the voltage of said storage unit, to which end said storage unit charging voltage regulator cell is in its second state only when maintaining a nominal charging voltage of the storage unit requires a top-up of current from said cell.

The invention makes it possible to apply fine regulation not only of the voltage delivered to the load network but also to charging of the storage unit, without it being necessary to use the onboard computer of the satellite, which makes the regulation system of the invention autonomous and reliable.

The invention is based on using a second cell assigned to the regulation function, in addition to that assigned to fine regulation of the bus voltage, and dedicated means for regulating the storage unit charging voltage.

Also, because it can be substituted for complex, costly and bulky electronic battery chargers, the system of the invention is light in weight and therefore inexpensive to use on board a satellite, an application in which each additional gram represents a significant additional cost.

The bus voltage regulator means and the storage unit charging regulator means are advantageously independent of each other and, if the two regulation functions converge toward assigning a single cell to regulation of the voltage of the bus and to regulation of charging of the storage unit, priority is given to bus voltage regulation. This ensures a regulated supply to the network whatever happens.

In a preferred embodiment, the bus voltage regulator means compare, in each cell, an average error in the nominal voltage of the bus and a reference value for the average error, the reference value being constant in each cell and increasing from one cell to the next, and the lowest value being that of the bus voltage regulator cell. This improves the avoidance of convergence of the two regulation functions mentioned above.

In this case, to reduce further the risk of convergence, regulation of the bus voltage starts with the cells having the highest reference value for the average nominal bus voltage error.

In another advantageous embodiment, the means for regulating charging of the storage unit compare, in each cell, an average error in the nominal charging voltage of the storage unit and a reference value for the average error, the reference value being constant within each cell and increasing from one cell to the next, and the highest value being that of the storage unit charging regulator cell.

This further reduces the risks of convergence of the two regulation functions.

In this case, to reduce still further the risk of convergence, regulation of charging of the storage unit starts with the cells having the lowest reference value for the average error in the nominal storage unit charging voltage.

The bus voltage regulator means can include a shunt switch in each cell connected in parallel with the cell.

Similarly, the storage unit charging regulator means can include a series switch in each cell for coupling the storage unit to the bus.

BRIEF DESCRIPTION OF THE DRAWINGS

Other features and advantages of the present invention will be come apparent in the course of the following description of a preferred embodiment of the invention, which is given by way of illustrative and non-limiting example.

In the accompanying drawings:

FIG. 1 shows very diagrammatically the topology of a power supply bus used on board a satellite, FIG. 2 shows the electrical circuit diagram of a cell of an energy regulation system according to the invention for an electrical power supply bus, and FIG. 3 shows the complete electrical circuit diagram of a system in accordance with the invention including a plurality of cells identical to that shown in FIG. 2.

MORE DETAILED DESCRIPTION

Components are identified by the same reference number in all the figures in which they are shown.

FIG. 1 shows the topology of a power supply bus 1 used on board a satellite. The power supply bus 1 includes a solar generator 10 using solar energy recovered from solar panels (not shown) of the satellite and an energy storage unit in the form of a battery 11. These two components form the power supply that supplies electrical energy to the payload 13 and to various onboard functions 12 of the satellite necessary for its operation, such as propulsion, attitude control, ground link, thermal control, etc.

This energy is distributed by an energy distributor unit 15 connected to all the above components and receiving a regulated voltage $V_0$ from an energy regulator unit 16 connected to the generator 10 and to the battery 11.

A battery management unit 17 manages the battery 11 which has a charging voltage $V_B$.

The regulator unit 16 is the core of the power supply bus 1 in that it distributes a stable regulated voltage $V_0$ to the network comprising the onboard functions 12 of the satellite and the payload 13 and also controls the energy sources 10 and 11.

FIG. 2 shows the electrical circuit diagram of a cell of an energy regulator system according to the invention for an electrical power supply bus BUS.

The cell includes a current generator GC which is part of the solar generator. A shunt switch I1 comprising a field-effect transistor Q1 coupled to a diode D1 conducting in the opposite direction is connected in parallel with the generator GC and is part of the bus voltage regulator means (see below). The current generator GC, which delivers a current $I_{GC}$, is coupled to the power supply bus BUS via a series switch I2 comprising a field-effect transistor Q2 and a protective diode D2. The switch I2 is part of the battery charging regulator means (see below).

The bus BUS conventionally includes a capacitive component $C_{BUS}$ and supplies power to a load CH (the load network).

The voltage delivered to the bus BUS is regulated to a value $V_0$ by causing the switch I1 to switch from one to the other of the following three states under the control of a control system generating an average bus voltage error control signal $V_{mea}$ (this is known in the art):

State 1: switches I1 and I2 are open and the generator GC supplies power to the bus BUS.

State 2: switch I1 is open and switch I2 is closed and the generator GC charges the battery BAT.

State 3: switch I1 is closed and switch I2 is open and no is power supplied.

The decision on the setting of the switches I1 and I2 is the result of comparing $V_{mea}$ with a reference voltage $V_r$ in an amplifier AMP1 that is also part of the bus voltage regulator means.

The general principle of the invention is explained next with reference to its operation with a single cell, and then with reference to its operation with several cells, after which the practical operation of the system according to the invention is described.

A regulator system according to the invention shown in FIG. 3 includes cells identical to that shown in FIG. 2. The reference voltage $V_r$ is constant for each cell but varies from one cell to another.

To explain clearly the operating principle of the invention, fine regulation of the voltage delivered to the bus BUS in the absence of regulation of charging of the battery BAT is described first. Fine regulation of the voltage delivered to the bus is assured by a single cell, referred to as the bus voltage regulator cell, whose shunt switch I1 operates in a "bang—bang" regime. In other words, when the voltage at the terminals of the cell exceeds the nominal voltage $V_0$, the switch I1 of this cell is closed, and as soon as the voltage at the terminals of this cell falls below the reference voltage $V_0$, this switch I1 is opened, with the result that the switch I1 is open only when maintaining the nominal voltage requires a top-up of current from this cell. This cell therefore switches from one state to the other in a cyclic manner with a duty cycle D less than 1, which explains the expression "bang—bang".

In this way, with n cells of the FIG. 1 type each delivering a current $I_{GC}$, and where $I_0$ is the current required by the network:

$$I_0 = mI_{GC} + DI_{GC}$$

There are m cells with their switch I1 open, n−(m+1) cells with their switch I1 closed, and one cell (the bus voltage regulator cell) operating with a duty cycle D between these two states.

If charging of the battery BAT is also regulated, the m cells used to regulate the bus voltage leave their State 1 as defined above and the n−(m+1) cells not used for supplying power and for regulating the bus voltage can be used to charge the battery BAT.

Accordingly, the battery charging current is defined by the number of cells, from the aforementioned n−(m+1) cells, that are in State 2.

According to the invention, fine regulation of the battery current $I_B$, enabling some of the charging of the battery BAT to be carried out at a constant current and further charging (the end of charging) to be carried out at a constant voltage and therefore with a variable current, is also assured by a single cell, referred to as the battery charging regulator cell, operating with a duty cycle D' less than 1 in a "bang—bang" regime.

The series switch I2 of this cell therefore conforms to a set point $V_{bea}$ received from a control function independent of that regulating the voltage delivered to the bus BUS and itself depending on a current or voltage reference, according to the segment of the charging of the battery BAT concerned. The switch I2 is therefore either open (State 2, current from the generator GC supplies power to the battery BAT), or closed (State 3, no power is supplied), the choice of the setting of the switch I2 being the result of comparing the voltage $V_{bea}$ with a reference voltage $V_{rb}$ in an amplifier AMP2 of the cell concerned and forming part of the battery charging regulator means (see FIG. 2).

The introduction in accordance with the invention of this second control function implies a hierarchy of cells defined by the voltages Vr and $V_{rb}$, which are constant within each cell but form an increasing progression from one cell to the next.

Thus regulating the voltage delivered to the bus BUS involves cells at the upper end of the scale of voltages $V_r$. As the voltage $V_{mea}$ descends the range of voltages $V_r$, the control signal from the amplifier AMP1 of the cells concerned sets the shunt switches I1 to State 2. The cell whose reference voltage $V_r$ is the lowest one operates under the "bang—bang" regime and constitutes the bus voltage regulator cell.

Regulation of the current delivered to the battery BAT by causing the voltage $V_{bea}$ to advance along the scale of voltages $V_{rb}$ switches the switches I2, starting with the lowest cells in the hierarchy. The cell with the highest reference voltage $V_{rb}$ operates in the "bang—bang" regime and constitutes the battery charging regulator cell.

Conflicts are avoided because the cell at the highest voltage $V_{rb}$ operates in the "bang—bang" regime.

A conflict will occur for an operating point implying the same cell for the "bang—bang" regimes. In this case priority is automatically assigned, for example by a logic circuit, to regulation of the voltage delivered to the bus BUS, with a duty cycle D. The battery current is no longer regulated and is governed by a duty cycle D' such that:

$$D'=1-D$$

Thus the battery current is expressed by the equation:

$$I_B=pI_{GC}+D'I_{GC}$$

where p is the number of series switches I2, from the set of n−(m+1) switches, that are closed (State 2).

To summarize, in this case the system according to the invention comprising n cells has an operating point corresponding to:
 m cells in State 1 (switches I1 and I2 open),
 one cell operating in the "bang—bang" regime for fine regulation of the voltage $V_0$, with the corresponding switch I2 open,
 p cells in State 2 (I1 open and I2 closed),
 one cell operating under the "bang—bang" regime for fine regulation of the current $I_B$, and
 n-p cells in State 3 (I1 closed and I2 open), supplying no power.

Thus according to the general principle of the invention, as just described, two independent regulator functions apply to each cell and two cells operating in the "bang—bang" regime coexist autonomously and independently; if the two regulator functions converge toward operation of a single cell in the "bang—bang" regime, priority is automatically assigned to regulation of the voltage $V_0$ delivered to the bus BUS. Battery charging uses energy that is not used by the load network.

The operation of the system according to the invention is described next in more detail, with reference to FIGS. 2 and 3, first for regulation of the voltage delivered to the bus BUS only and then for regulation of the charging of the battery BAT only.

To regulate only the voltage delivered to the bus BUS, if the operating point imposes the transfer of energy from the solar generator GC to the load CH, the amplifier AMP1 transmits a zero control signal to the transistor Q1 to force it to open. At the same time the zero signal is applied to the gate of a transistor Q5, which also opens, forcing the transistor Q2 to open regardless of the value of the control signal from the amplifier AMP2, thereby isolating the generator GC from the battery BAT. As the diode D1 is conducting, the generator GC is biased to the voltage $V_0+V_{D1}$, and a current $I_{GC}$ is transferred to the load CH. Operation is exactly the same when the cell is operating in the "bang—bang" regime.

To regulate the charging of the battery BAT, if transfer of energy to the battery is required, the amplifier AMP2 transmits a high (logic 1) control signal to the gate of a transistor Q4, which closes. The amplifier AMP1 also transmits a high (logic 1) control signal, which is also applied to the transistor Q5, which starts to conduct. Q2 then starts to conduct. The solar generator is then biased to the voltage $V_B+V_{D2}$ and delivers a current $I_{GC}$ to the battery BAT.

The reliable operation of the cell requires Q1 to open when the battery section is operative (Q1 is nominally closed when the regulation applied by the amplifier AMP1 does not require any energy to be supplied to the network). This condition is satisfied by applying logic 1 to the gate of Q3, which forced Q1 off, because the gate of Q3 is electrically connected to AMP2. The resistance R satisfies this condition and the current from AMP1 is then drained by the transistor Q3. Operation is unchanged when the cell is operating in the "bang—bang" regime, the transistor Q2 operating in accordance with commands from the amplifier AMP2.

FIG. 3 shows the electrical circuit diagram of a regulator system D according to the invention comprising n cells identical to that of FIG. 2 (only three cells are shown because they are all identical). A conventional battery discharger module (BDR) has to supply a regulated network voltage.

In this system, two amplifiers AMP and AMPB are respectively connected to receive a network reference voltages $V_R$ and a battery reference voltage $V_{RB}$. The amplified outputs of the amplifiers AMP and AMPB, respectively consisting of the control signals $V_{mea}$ and $V_{bea}$, are sent to all the cells. The control function therefore uses a control signal distributed simultaneously to all the cells. As mentioned above, the control signals are compared in the cells to discrete reference voltages $V_{rn}$ and $V_{rbn}$ (the subscripts n identify the rank of the cell concerned), distributed in accordance with a recurring law by means of resistive bridges. These comparisons generate discrete voltages that are similar to logic levels from the positive feedback amplifiers AMP1 and AMP2 of each cell. The routing of these logic signals is described in detail above.

Of course, the invention is not limited to the embodiments just described.

Thus its general principle can be implemented by any appropriate electronic system, not necessarily a system of the type shown in FIGS. 2 and 3.

Finally, any means can be replaced by equivalent means without departing from the scope of the invention.

What is claimed is:

1. An electrical energy regulator system for a power supply bus connected to a load network using an electrical energy, said system including:

an electrical energy storage unit, a solar generator comprising a plurality of cells, for each of said cells, means for regulating the power supply voltage of said bus adapted to impose on said cell one of the following three operating states:

a first state in which current from said cell supplies power to said bus, a second state in which current from said cell supplies power to said storage unit, and a third state in which said cell is shunted, said cells being divided by said bus voltage regulator means into:

a first group in which at least one of said cells supplies power to said bus and one of said cells referred to as a bus voltage regulator cell is assigned to regulation of the voltage of said bus and to this end is in its first state only when maintaining a nominal bus voltage requires a top-up of current from said cell, and a second group in which at least one of said cells is either in a second state or in a third state, as a function of a required charging current of said storage unit, the number of cells in the second state being a function of the required charging current, wherein said system further includes means for regulating the charging of said storage unit which assign at least one of said cells of said second group to supplying power to said storage unit and one of said cells, referred to as a storage unit charging regulator cell, to regulation of the voltage of said storage unit, to which end said storage unit charging voltage regulator cell is in its second state only when maintaining a nominal charging voltage of the storage unit requires a top-up of current from said cell.

2. A system according to claim 1, wherein said bus voltage regulator means and said storage unit charging regulator means are independent of each other and, if the two regulation functions converge toward assigning a single cell to regulation of the voltage of said bus and to regulation of the charging of said storage unit, priority is given to bus voltage regulation.

3. A system according to claim 1, wherein said bus voltage regulator means compare, in each cell, an average error in the nominal voltage of said bus and a reference value for said average error, said reference value being constant in each cell and increasing from one cell to the next, and the lowest value being that of said bus voltage regulator cell.

4. A system according to claim 3, wherein regulation of the bus voltage starts with cells having the highest reference value of said average error in the nominal voltage of said bus.

5. A system according to claim 1, wherein said means for regulating charging of the storage unit compare, in each cell, an average error in the nominal charging voltage of said storage unit and a reference value for said average error, said reference value being constant within each cell and increasing from one cell to the next, and the highest value being that of said storage unit charging regulator cell.

6. A system according to claim 5, wherein regulation of the charging of the storage unit begins with cells having the lowest reference value for said average error in the nominal charging voltage of said storage unit.

7. A system according to claim 1, wherein said bus voltage regulator means include a respective shunt switch in each of said cells connected in parallel with said cell.

8. A system according to claim 1, wherein said storage unit charging regulator means include a series switch in each cell for coupling said storage unit to said bus.

* * * * *